Jan. 26, 1960 W. O. BEYER 2,922,665
GRIP ELEMENT AND COUPLING DEVICE
Filed Aug. 12, 1954 2 Sheets-Sheet 2
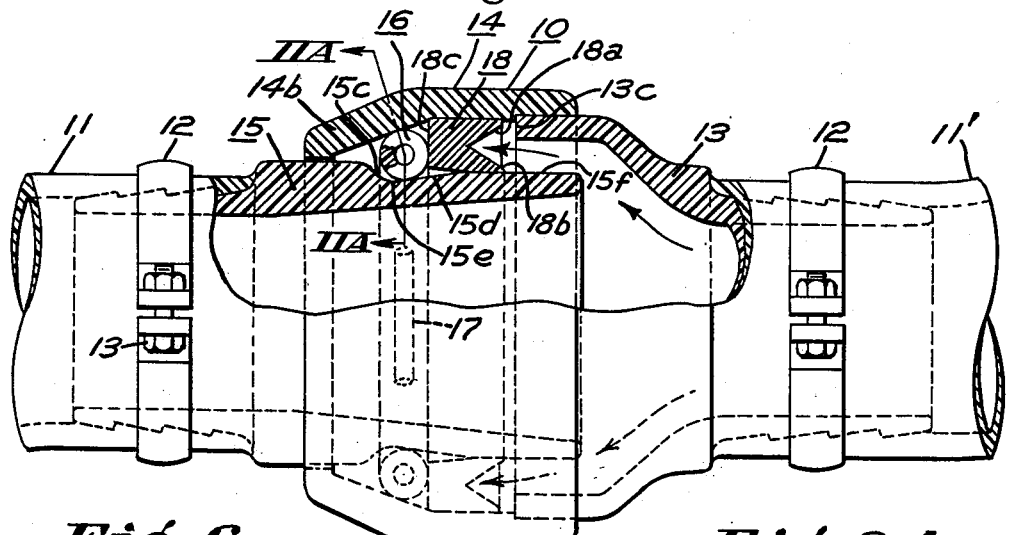
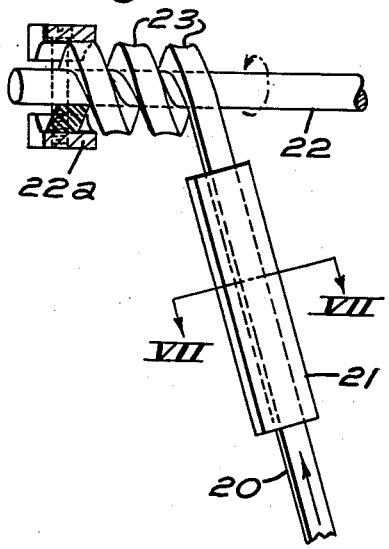
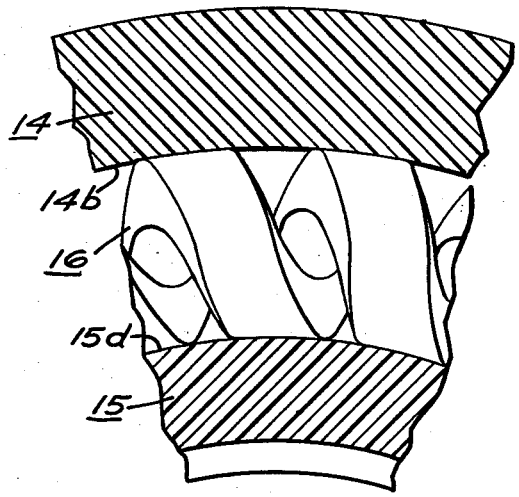
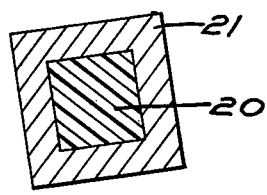
INVENTOR.
Walter O. Beyer
BY Green, McCallister & Miller
HIS ATTORNEYS.

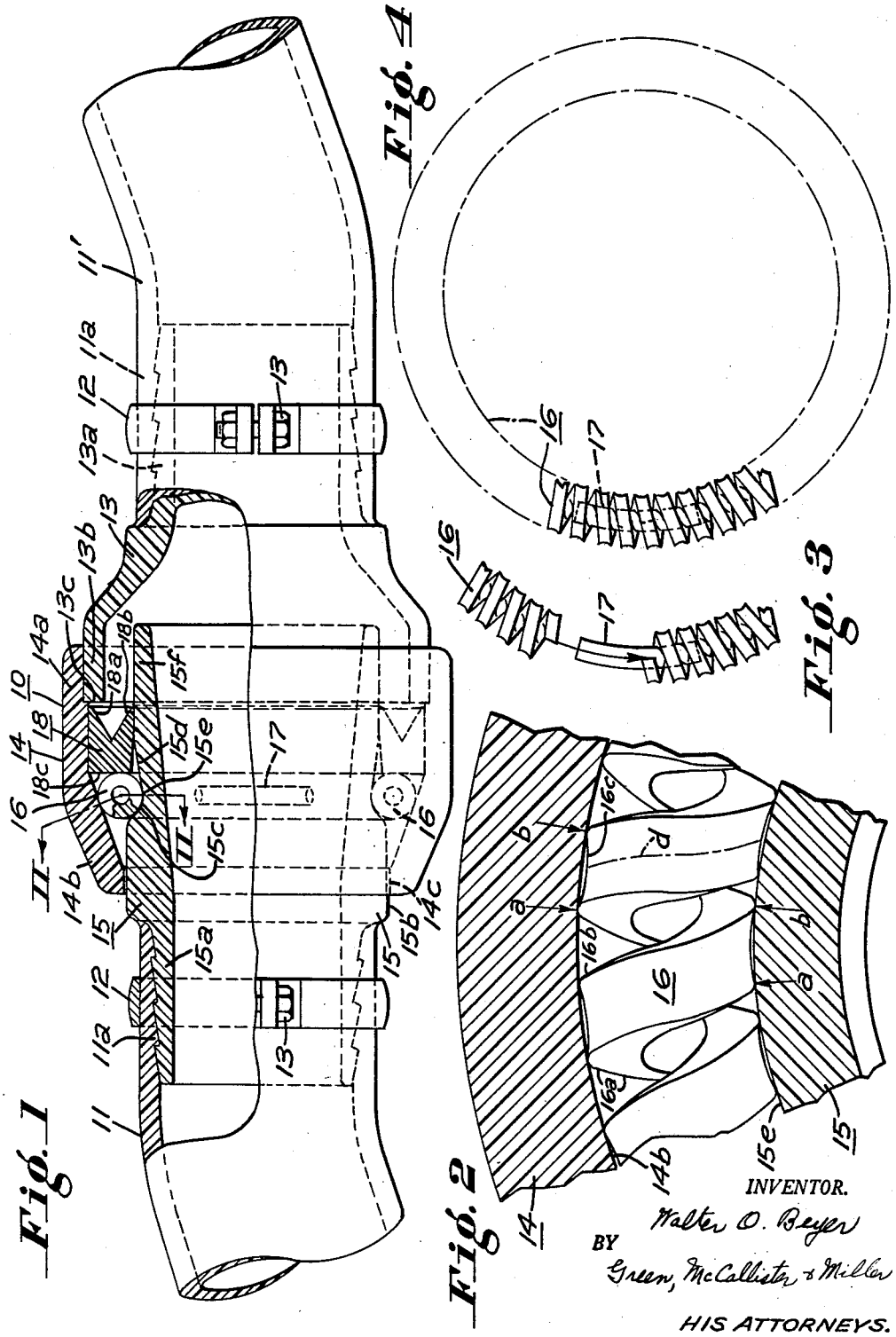

United States Patent Office 2,922,665
Patented Jan. 26, 1960

2,922,665
GRIP ELEMENT AND COUPLING DEVICE
Walter O. Beyer, Pittsburgh, Pa.
Application August 12, 1954, Serial No. 449,301
9 Claims. (Cl. 285—105)

This invention relates to a quick-release type of fluid coupling and particularly, to a fluid coupling which may be made of a material such as plastic.

An important phase of my invention pertains to the provision of an annular grip coil suitable for a quick-release type of coupling which will make practical the utilization of a plastic type of material or a material having a limited strength characteristic from the standpoint of a rotative or turning movement about its spiral axis. Although the principles of the present invention may be applied to couplings made of metal and other materials, it has been essentially devised from the standpoint of the utilization of a plastic material or one having the characteristics of a plastic material.

Previous to my present invention, I have been able to devise a so-called quick-release type of coupling having particular suitability in the field of irrigation equipment, where it is desirable to, in the first place, provide a coupling that will be positive in its sealing and holding action upon the application of fluid pressure and particularly, liquid pressure, and which can be easily and simply disconnected or its parts separated when fluid pressure is off and it is desired to uncouple a conduit or pipe system, so that the individual pipe or conduit sections may be expeditiously carried from one location to another and also, so that they may be re-arranged in various desirable patterns to meet irrigation or sprinkling requirements at a new location. In this connection, reference is made to representative patents such as Nos. 2,184,376, 2,259,453, and 2,587,810. The two earlier of these patents show a basic type of quick-release coupling construction and the later patent shows an improvement in the grip coil construction, all, as have been devised, particularly from the standpoint of the utilization of metal materials such as steel, aluminum, and magnesium or their alloys.

In recent years, there has been a definite trend toward the utilization of plastics in connection with piping and conduit sections. Since, it is rather difficult to bond a metal to a plastic and since a plastic pipe is often used because of its inexpensive and corrosion-resistant characteristics, it is somewhat disadvantageous to be compelled to utilize a metal coupling with plastic piping or conduit members.

From the above, it will appear that there is a definite need for a quick-release type of coupling of the general characteristics of the type above-mentioned which can be made of plastic materials or of materials having plastic-like characteristics and without the necessity for utilizing any metal materials which come into direct contact with the fluid or liquid to be carried by the system or, in other words, without the need for metal parts interiorly of the assembly. Heretofore, no one has been able to provide a coupling meeting these requirements, and in endeavoring to meet the problem presented, I have determined that one of the most important factors involved has been to provide a grip coil which may be made of such plastic-like material and which will stand up under the stresses and strains of a quick-release coupling utilization.

Thus, it has been an object of my invention to provide a new and improved form of coupling construction of a so-called quick-release type which will make possible the practical utilization of plastic-like characterized materials.

Another object has been to discover the factors involved in providing a successful coupling utilizing plastic-like materials and to devise a construction which will meet such factors and provide a practical solution to the problem involved.

A further object of my invention has been to devise a new and improved form of grip-coil construction of a type which will make practical the utilization of a plastic-like material.

A still further object of my invention has been to devise a quick-release coupling construction which will stand up under the stresses and strains of a relatively high fluid pressure, which may be employed with an assembly of sufficient flexibility for utilization wherein the conduit, tubing or pipe sections are to be applied or laid in somewhat irregular or surface-coutour-conforming patterns.

These and many other objects of my invention will appeal to those skilled in the art from the drawings and the coupling construction shown and specifically described herein.

In the drawings, Figure 1 is a side view in elevation and partial section illustrating a coupling construction of my invention;

Figure 2 is a greatly enlarged fragmental section taken along the line II—II of Figure 1 and showing the relationship between opposed gripping surfaces and the grip coil of my invention before fluid pressure has been applied or after fluid pressure has been released, or in other words, before the grip coil or annulus has advanced along opposed tapered gripping surfaces as affected by the application of fluid pressure;

Figure 2A is a view similar to Figure 2 and taken along the same section line, but illustrating the relationship of the parts after full fluid pressure has been applied and the grip coil or annulus has been advanced along opposed tapered gripping surfaces into full holding engagement therewith;

Figure 3 is an enlarged fragmental end view in elevation through a grip coil or annulus of my invention and showing how the ends are assembled or joined to provide a complete ring or grip annulus;

Figure 4 is an end view in elevation on the scale of Figure 3 and showing the complete grip coil or annulus with its ends in an assembled or joined relationship and as employed in a mounted position within the coupling;

Figure 5 is a view somewhat similar and on the same scale as Figure 1 with end connections broken away and illustrating the position of the parts, including the grip annulus or coil, after line or fluid pressure has been applied to the coupling;

Figure 6 is a somewhat diagrammatic view in elevation illustrating how the grip annulus or coil of my construction may be formed from a strip length of material;

And Figure 7 is a section taken along the line VII—VII of Figure 6.

In arriving at my invention, in addition to providing a coupling construction which would meet stress and strain requirements as well as the quick-release requirements, I also took into consideration the factor of utilization of such a coupling wherein, as in irrigation and mine conduit usage, it may be laid directly on the ground surface and thus, the assembly should have the ability to conform to the land surface or other irregular contour without setting up additional stresses and strains in the system. Heretofore, I have determined that it was advisable to so construct the interfitting coupling parts or members, that a shape-conforming relationship would be possible without incorporating this feature in the conduit or pipe sections, themselves. In other words, I have before been able to develop a coupling construction in which a male or nose coupling part would be able to move or pivot somewhat angularly with respect to a housing body part, without breaking the fluid seal, without damage to the construction, and without adversely effecting its member gripping action. In such an arrangement, it was necessary to provide a suitable clearance spacing between the male or nose part and the converging end or rim flange of the mouth of the throat portion of the housing body part to permit a so-called pivotal action about the grip coil, itself.

I have discovered in evaluating the problem from the standpoint of plastic-like materials that such a type of pivotal action between the coupling parts is not practical and particularly, from the standpoint of the utilization of a grip coil or annulus of a plastic-like material. However, I also determined that such a rather wide range of pivotal action within the coupling, itself, was not necessary where pipe sections of a plastic-like material are utilized, since they, in themselves, have a flexible shape-conforming characteristic along their lengths. Thus, such a pivotal action in the coupling parts is unnecessary and in many cases it is undesirable, e.g. where the coupling is to be utilized in connecting a rigid or flexible pipe member or section to a dead-end or closed-off end part.

Thus, I have discovered that a coupling construction of my present invention has a practical utilization in connection with plastic-like pipe, tubing or conduit sections or lengths, as well as with relatively rigid or non-flexible pipe sections or lengths, e.g. of metal material, when the coupling is to be employed with a dead-end part. From this standpoint, I have particular reference to the utilization of a grip coil or annulus made of a plastic-like material and irrespective of whether or not the coupling parts, themselves, are of a plastic-like or relatively rigid material, such as steel, aluminum or magnesium.

It cannot be too strongly emphasized that it is highly important to make possible the utilization of a grip coil of a plastic-like material, as distinguished from a relatively stronger material, such as metal, and that such a coil must inherently have flexibility and maintain such flexibility throughout a relatively long, useful, life. It is well known that spring steel is ordinarily a high carbon-type of steel which is easily corroded. Thus, it has been customary to provide a grip coil made of such material with a protective coating. Although spring characteristics can be obtained in a corrosion-resistant steel, such as stainless, this greatly increases the cost of an installation. Also, although stainless steel, for example, has good corrosion-resistant characteristics as to certain types of materials, it has relatively poor characteristics as to other types. On the other hand, plastics are available which have a relatively high resistance to corrosion of various types and have a non-contaminating relationship with many different types of fluids. It will be noted that the coupling may be employed to carry acid-containing mine water, alkaline chemicals or liquid food products.

After fully evaluating the problem presented, I found that it somewhat centered about the provision of the so-called grip coil, itself. In this connection, plastic-like materials have flexibility, but what may be termed a limited flexibility before breakage or rupture. They also have more flexibility or strength as to certain types of stresses and strains than others. It will be apparent that the stresses and strains are of somewhat a complex nature in a grip coil, since the individual turns and convolutions of its annulus or spiral-like shape act as strut members and must be capable of some shape-conforming movement, so that the coil may be advanced with respect to and be contracted peripherally by a converging spacing between conical or tapered gripping or operating surfaces, and so that a gripping action may be accomplished proportionately to the amount of fluid or line pressure applied. To insure an inherent quick-release action, the coil should be capable of returning to its "as formed" or a relatively non-flexed position after fluid pressure has been relieved, so that the connected pipe or tubing section or member may be disconnected.

Analyzing the various factors involved, I determined that it is essential in utilizing a coil or annulus of a plastic-like material to avoid what was more or less inherent in the utilization of a metal coil, namely, a twisting or turning movement of the coil turns or convolutions about their substantially continuous, central spiral or longitudinal axis. Also, it was found important from the standpoint of essentially providing an efficient gripping action and secondarily, of avoiding damage, such as by abrasion, to the opposed gripping surfaces, to make possible a transversely widened or to approach a substantially full transverse surface area of contact between the turns of the grip coil and the opposed operating or gripping surfaces when full fluid pressure has been applied.

In accordance with my invention, I have been able to meet the above-discussed factors by so constructing the grip coil that it has a pair of opposed side-edge, line or arc-bearing contacts with the opposed gripping surfaces initially (before fluid pressure is applied) and then upon the application of fluid pressure is subjected to what may be termed a side-expanding and shape-conforming action, such that the full outer surface width of each turn moves or is flexed towards what may be termed, a transverse, substantially full surface contact between the opposed gripping surfaces. This is done by providing the coil turns on their outer or gripping surfaces with a somewhat transversely-concave shape which is shape-conformed, upon the application of fluid pressure, towards a substantially flattened-convex (curvilinear) or full surface contact with the opposed gripping surfaces, see Figure 2A.

As shown particularly in Figures 2 and 2A, the initial contact is provided at a pair of opposed continuous line contacts, as indicated by arrows $a$ and $b$. This initial type of contact provides two tilt-preventing, extreme line edges on each coil turn which act as positive, tilt-preventing contacts when the coil or annulus is advanced or converged into a reduced space or area of the tapered engaging or opposed operating surfaces of the coupling part or parts and upon the application of fluid pressure. Thus, there is no twisting or turning of the coil about its central spiral axis, indicated by $d$, of Figure 2, as the turns or convolutions are urged towards each other to conform to the reduced spacing, or as the coil is, in effect, reduced in its peripheral or circumferential diameter. At the same time, the action is such that concave surface 16c as shown particularly in Figure 2, is moved towards the opposed engaging surfaces of the coupling parts and towards a substantially conforming, full transverse or full surface area contact with such opposed gripping surfaces of the coupling.

I determined that if the grip coil or annulus is provided with an initial slightly convex, relatively flat or square section, such that its actual engaging surface is initially in a substantially full engagement with the opposed gripping surfaces of the coupling, that the central portion 16c tends to bulge out along the axial line of each turn and produce a tilting action when liquid pressure is applied. Thus, it is highly important to provide the grip coil with a slight concavity across the transverse dimension of its outer or engaging surface, in order that the final resultant surface contacts approach full transverse surface contacts with the opposed gripping surfaces and, from the standpoint of avoiding abrasive damage to the opposed and engaging surfaces and to the grip coil under the full pressure load of the coupling and essentially, from the standpoint of avoiding breakage caused by a turning action of the turns about their common spiral axis.

I have discovered experimentally and by mathematical analysis that the portion of the grip coil contacted by the pressure heel of a fluid pressure-sensitive sealing gasket or annulus and tangentially seated at surface contacts with opposed operating surfaces that define a converging operating spacing, is subjected to load pressures and material stresses similar to the load pressures and stresses in an arch rib having a single normal central load. In a coil turn, the maximum moment occurs at the section central to the contact of the pressure heel of the gasket with the coil turn periphery.

I have made calculations of the bending stresses in tension and find that tensile stress in the grip coil is well below the tensile strength of suitably available plastic-like materials. For example, with a line pressure of about 100 lbs. per square inch, the coil turn arch will carry a load of about 20 lbs. Assuming a coil turn section of about $3/16$ x $3/16$ inches, a one inch span with a $3/16$ x $3/16$ straight rod or length loaded 20 lbs. centrally will give a tensile stress in bending of about 450 lbs. per square inch. The actual coil turn would have a span of about $3/8$ of an inch and the arch formed is inherently stronger in bending than the straight rod.

In accordance with my invention, rotation of the internal fibers of the coil turns about their spiral axis is prevented, as the grip annulus is advanced or withdrawn from a converging tapered area or space defined by opposed surfaces of the coupling. The initial cross-concavity of each turn across its surface tends to center itself on a cross-line bearing on the coupling grip surfaces and rotation about the central spiral axis is positively prevented by the opposed, double-line contacts that lie on opposed sides of the central axis. There is thus no possibility of failure of the grip coil which I found is inherent if an attempt is made to employ a grip coil of a plastic-like material of the conventional shapes used for metal or steel-like material.

Also, I have found, in utilizing a plastic annulus or grip coil, that it is important to avoid a tilting action upon its turns or convolutions such as may be incurred by so constructing the parts of the coupling that they may be turned at an angle or tilted with respect to each other. In other words, the clearance, spacing between coupling parts should be minimized, but may be sufficient to permit the two coupling parts to be freely slid into and out of a cooperating relationship with respect to each other.

Referring to the drawings, Figure 1, I have shown a representative coupling construction 10 embodying my invention. This coupling is illustrated as used with flexible conduit members 11 and 11', although it may be equally well applied with a non-flexible pipe member and a closed or dead-end portion to take the place of the connection between the pipe section 11 and an annular member or coupling male or nose part 15 which is to be positioned in a spaced-apart relationship within a second annular member or coupling housing body as defined by parts 13 and 14.

The right-hand pipe, tubing or conduit section 11' is shown provided at its extreme or inner-end with an inner wall of sawtooth or slanted-step construction 11a which fits over and forms a joint with a similar outer wall portion 13a of an extension or connecting part 13 of a coupling housing body part or throat 14.

The extension part 13 has an enlarged cylindrical portion 13b at its inner end which fits in or is slightly inset within an inner wall portion of a cylindrical wall portion 14a of the coupling throat or housing body part 14 and may be secured thereto by cementing or by a heat application, assuming that thermo-plastic materials are employed. It may be noted that the extension part 13, at its inner edge 13c, defines a limit or stop shoulder for an outer edge 18a of a resilient, rubber-like, annular sealing gasket 18 which along its outer periphery rests upon and is carried by the cylindrical wall portion 14a of the housing body part or throat 14. The wall portion 14a thus defines an inner operating surface for the coupling. As shown, a stop-limit portion is thus provided on the housing body that faces towards a fluid pressure chamber defined by the gasket and facing towards the outer end of the housing body to limit movement of the gasket with respect to such outer end.

At its forward end, the throat part 14 has a converging, cone-shaped or inwardly-tapered wall portion 14b whose inner operating surface provides an engaging surface portion for a grip coil or annulus 16. The tapered wall portion 14b, at its extreme end or mouth, terminates in a guide surface or substantially horizontal lip or rim flange 14c which defines a slight clearance spacing with an opposed guide surface or intermediate cylindrical portion 15b of the male or coupling nose part 15, see Figure 1. These guide surfaces are provided adjacent the outer or forward end or mouth of the coupling housing body and adjacent the outer end portion of the annular member or nose part 15 and have a relatively closely positioned and non-tilting sliding relationship with each other. It is this relationship or clearance spacing which is important from the standpoint of providing a free and easy axial insertion and removal of the member or nose part 15 into and out of the coupling body part 14 or the annular member defined by the parts 13 and 14, and of preventing a pivotal action between such annular members which, as previously pointed out, is to be avoided when a plastic-like grip coil or annulus 16 is to be utilized.

The nose part 15, like the extension or connecting part 13, has an outer saw tooth-like or slanted-step securing or joint portion 15a which engages within a complimentary inner portion 11a of the conduit 11. Although the joints between the pipe members 11 and 11' and the portions 13a and 15a of the coupling may be secured by cementing or by melting the portions together, I prefer to utilize a mechanical type of joint, as reinforced and strengthened by an external, split-annular, metal clamping band 12 having a bolt and nut assembly 13 to clamp it together at its split ends. Such a type of joint is equally applicable and effective with plastic-like and metal-like materials.

It will be noted that the intermediate cylindrical portion 15b of relatively heavy section of the nose part 15 serves as a guide portion for the assembly and disassembly of the coupling and also provides at its inner boundary, a push-in-release shoulder 15c for the grip coil 16. The shoulder 15c is located behind valley 15e and inclined surface portion 15d to engage the grip coil or annulus 16 and move it towards a diverging end of converging spacing between the housing body and annular member 15. The shoulder 15c is rounded or curved to substantially conform to the curvature of the convolutions or turns of the grip coil 16 and into a depressed seating portion, groove or valley 15e within which the grip coil 16 may initially rest when the coupling parts are moved into an assembled relationship. As shown, the valley 15e also has a curvature substantially conforming to the curvature of the grip coil 16.

An annular forwardly-outwardly-converging or inwardly-diverging, tapered or cone-shaped operating surface portion 15d extends from the valley or groove portion 15e and into an outer or cylindrical end portion 15f which has a slightly lesser outer diameter than the intermediate cylindrical portion 15b to facilitate a simple axial and non-turning insertion and removal of the annular member or nose part 15 with respect to the housing body or its body part 14. As shown in Figure 5, the opposed operating surfaces of 14b and 15d define or provide an operating spacing that converges towards one end and that diverges towards the other end of the coupling and make a tangential contact with the grip annulus 16 when the latter is moved into gripping engagement, since such surfaces, unlike the valley 15e and shoulder 15c, do not have a curvature corresponding to that of the annulus 16.

In the construction shown, I have employed a compound type of operating surface relationship, where opposed annular tapered or inclined, or cone-shaped operating surfaces of the housing body 14 and nose part 15 slope in the same direction to define a reduced annular operating spacing for the grip coil 16 in the direction of fluid pressure application. As shown, one of the opposed surfaces has a greater inclination than the other, such that they define an effective angular relationship between each other (see Patent No. 2,259,453), as measured by the difference of between their slopes or inclinations. For example, I have shown the surface of 14b with a slope of about 20° and the surface of 15d with a slope of 10° to give an effective slope angle of 20° less 10° or 10°.

The inner lip portion 18b of the gasket 18 is adapted to engage or abut against the outer cylindrical portion 15f and when fluid pressure is applied, to positively seal off fluid flow between the housing body part 14 and the nose part 15. The opposed lip portions 18a and 18b also define the fluid pressure-sensitive chamber which when positive fluid pressure is applied, causes a pressure heel portion 18c of the gasket to advance the grip coil or annulus 16 along the converging operating surface portion 14b of the housing body or throat 14. That is, the grip annulus 16 is, as shown, positioned in a cooperative relationship with the heel portion 18c for actuation thereby and advancement with its gripping surfaces in an operative-contacting relationship with the opposed operating surfaces of the housing body and nose part or member.

When the coupling of my construction is employed as a dead-end coupling, the nose or male part 15 is provided with a closing-off end wall which may extend across a back end of the cylindrical portion 15b. The connecting portion 15a is, of course, eliminated.

Referring particularly to Figures 2 and 2A, I have illustrated the pair of opposed projecting surface edges of the turns or convolutions of the grip coil or annulus 16 by the reference numerals 16a and 16b. I have also indicated the cross or transverse concave portion between the portions 16a and 16b by 16c. The spiral axis of the turns which, of course, extends centrally-axially along the full length of the coil 16 is indicated as d.

As shown by a comparison of Figures 1 and 5, when fluid line pressure is applied, see the arrows of Figure 5, the nose or male part 15 is forced slightly backwardly and the grip annulus 16 is forced by the heel portion 18c of the annular gasket 18 into a smaller converging annular or conic spacing between the opposed tapered operating surface portions 14b and 15d. Figures 1 and 2 show the relationship of the parts before fluid pressure is applied and Figures 2A and 5 show their relationship after the application of fluid pressure.

When fluid pressure is released and it is desired to separate the coupling parts or remove the nose part 15, the nose part is first pushed slightly axially-inwardly to cause its push-release shoulder 15c which is located behind its inclined surface 15d, to engage the grip annulus 16 and move it towards the diverging end of the operating surface of the throat portion 14b or towards the diverging end of the converging spacing between the opposed operating surfaces of the housing body and nose members, and until the grip annulus is in a position such that its inner diameter clears the cylindrical or annular portion 15f of smaller diameter. At this time, the nose part 15 may be withdrawn from the housing body part 14 with a simple axial or longitudinal pull and without the need for a relative turning movement between the coupling parts or members.

In Figures 3 and 4, I show how adjacent ends of the coil 16 may be joined, assembled or articulated to provide an annulus. I employ a plug piece 17 of plastic rod corresponding in curvature to that of the closed coil and preferably secure it within one end of the coil, so that the other end may be slid into position thereover and into abutment with the one end.

I have found that a somewhat resilient material which in its set or formed condition, although somewhat rigid, is incompressible, so that the coil gripping surface may be spread, flattened or moved towards a widened transverse gripping engagement or contact when the coil or annulus is converged or its convolutions are contracted, such as a so-called plastic material, whether of a thermoplastic or a thermal-set plastic type, may be utilized in making the parts and particularly, the grip coil or annulus of my coupling construction. Although, as previously intimated, the housing body and the nose member may be made of any material, including metal, I have successfully utilized an acrylic resin of a thermo-plastic type, such as Plexiglas, for the coupling housing body, the nose member, the connecting piping members or sections, and the grip coil or annulus 16. I have employed a strip length of rectangular or square cross-section for making the grip coil of plastic material in a semi-cured state and then, have completed the curing and cold-set its material during the winding or progressive spiraling of the length about a mandrel to form the coil. In this connection, heat is applied during the feeding operation, as by employing an electrical heating coil about a feeding guide member, to feed the length in a semi-plastic condition; a temperature in the neighborhood of about 160° to 180° F. is suitable for an acrylic resin.

Thus, in accordance with my invention, I employ a grip coil or annulus 16 which is flexible and is made from a somewhat resilient material whose convolutions or turns are integral and substantially continuous and are in a spaced-apart relationship along the annulus as it is shaped or formed. The peripheral gripping surface of the annulus 16 has transversely spaced-apart or cross-opposed surface contacts adjacent the opposite sides of its convolutions that widen towards the longitudinal or central axis of the annulus and thus, towards each other, when the grip annulus is contracted by being moved towards the converging spacing defined by the inner or nose and the housing body members of the coupling. When fluid pressure is released, the annulus 16 has a tendency, due to its flexibility or somewhat spring-like nature, to return to a non-contacting or engaging relationship with respect to one of the opposed operating surfaces. This is positively effected when the inner annular member 15 is to be removed from the outer member by pushing the annulus 16 towards the diverging end of the converging spacing and until its inner periphery is out of engagement or clears the inner portion 15f of the nose or inner annular member 15. Although the outer annular member is employed to retain the grip annulus 16 and the annular gasket 18, the pull-out removal of the inner annular member 15 can be effected when the grip coil is in a relationship such that it defines a clearance spacing with the portion 15f of the inner member. The inner lip portion 18b of the gasket being of light flexible construction, does not, in any sense, prevent this desired type of action.

In Figures 6 and 7, I have shown, by way of illustration, how the grip coil or annulus 16 may be constructed, employing a thermo-plastic material. A strip length of the material 20 of rectangular section in a heated, semi-plastic condition, is fed from a complimentary rectangular bore of a guide box or member 21 towards one end, such as the front end, of a rotating cylindrical mandrel 22. The feed, as controlled by the guide member or box 21, is in a leading-obtuse angular relationship with respect to the forward or leading end of the mandrel 22 to, as convolutions or turns 23 are progressively spirally formed about the mandrel 22 in a spaced-apart relationship therealong and towards a trailing end thereof, produce a raised edge along one side of the contacting or gripping surface of the coil 16, as formed. To apply a transversely-opposite raised edge along the opposite side of the contact or grip surface of the coil, I apply a turning force to the guide or feed member 21 which is opposite or counter to the direction of the rotating, turning movement or force of the mandrel 22. Thus, as the length 20 is fed, it is provided, while still in a semi-plastic heated condition, with opposed side contacts which as formed, produce the transversely convex contour or cross-contour on the contacting or gripping surface of the coil. The coil 16, as shaped, is air-cooled and set as its convolutions 23 are progressively formed on the mandrel 22, by the room temperature ambient atmosphere.

In Figures 6 and 7, the mandrel 22 is shown as being rotated in a clockwise direction; thus, the guide member 21 has a counter-clockwise turning force or canter imparted to it, as the length 20 is advanced upon the rotating mandrel 22 to progressively form the spiral turns 23. The angular relationship of the guide member 21 or the feed of the heated length 20 may be in an angular relationship that substantially corresponds to the spiral angle of the turns 23. The angular feed and the spiraling action produce a high edge on the left side of the turns in Figure 6 as it is fed, while the counter turning or canter force applied to the length 20 as it is fed to the mandrel 22 through the agency of the guide member 21, raises or produces a high edge on the opposite side, on the right side of the turns 23 in Figure 6.

In Figure 6, I have shown a clamp 22a for holding the end of the length 20 in position as it is being fed. It comprises a pair of upper and lower clamping arms in an opposed relationship with each other. Each arm has a curved central portion on its inner side to correspond to the curvature of the turns 23 of the coil. A pair of set bolts extend through opposite end portions of each arm and are threaded into the lower arm to removably secure them together in a clamping relationship over the end of the length 20 or spiral 23.

What I claim is:

1. In a coupling having a pair of annular members to be connected together, one of which is to be positioned as a housing in a spaced-apart relationship about the other, the pair of members having opposed operating surfaces defining a converging annular spacing towards one end of the coupling, a flexible grip annulus of a somewhat resilient material to be operatively positioned about the other member and between the opposed operating surfaces, means to move the annulus towards the converging spacing, said annulus having integral convolutions defining a substantially continuous peripheral gripping surface therealong, and said gripping surface being substantially concave thereacross to provide opposed side contacts with the opposed operating surfaces.

2. In a coupling device for holding a member in position with respect to a housing wherein, the housing and the member have opposed operating surfaces defining a converging spacing towards one end of the housing, a flexible grip coil annulus of plastic-like material to be operatively positioned about the member and within the housing between the opposed operating surfaces for movement towards the converging spacing, said grip annulus having integral and normally spaced-apart convolutions, said convolutions having inner and outer peripheral portions that are concaved in an axial direction of the annulus initially to define spaced-apart tilt-preventing side edge contacts with the opposed operating surfaces said side edge contacts widening toward each other upon moving the annulus along the converging spacing into a radially-contracted relationship to prevent the convolutions from tilting about their longitudinal axis.

3. In a quick-release coupling construction for connecting at least one end thereof to a fluid supply-pipe member which comprises, a housing body having means to secure it at its outer end to the pipe member for receiving fluid under pressure therefrom, an annular member to be releaseably connected to and positioned within and in a spaced-apart relationship with respect to said housing body, said housing body and annular member having opposed operating surfaces defining a converging annular spacing towards the other end of the housing body, an annular fluid-pressure-sensitive sealing gasket operatively positioned about the annular member and between the operating surfaces and having a pressure heel portion facing towards the converging spacing, said resilient gasket defining a fluid pressure chamber towards the outer end of the housing body that is open to fluid flow into the housing body, a stop-limit portion on the housing body facing towards the fluid pressure chamber thereof to limit movement of said gasket with respect to the outer end of said housing body, a flexible grip coil annulus of a somewhat resilient shape-retaining material and operatively positioned about the annular member and between the opposed operating surfaces for movement towards and along the converging spacing thereof, said annulus being positioned in a cooperative relationship with the pressure heel portion of said gasket for actuation thereby, said annulus having integral convolutions defining a pair of spaced-apart and substantially continuous gripping contact surfaces therealong in an operative contacting relationship with respect to the opposed operating surfaces, said gripping surfaces having a substantially concave shape thereacross disposed in an axial direction of the annulus which is shape-conformed towards a substantially flat shape thereacross when said annulus is moved towards the converging spacing in gripping contact with respect to the opposed surfaces.

4. A coupling as defined in claim 3 wherein, said grip annulus is of plastic-like material and said housing body and said annular member have aligned guide surfaces adjacent the other end of the housing body for introducing and removing said annular member with respect to said housing body, and said guide surfaces have a relatively closely positioned and non-tilting-sliding relationship with respect to each other.

5. A coupling device as defined in claim 4 wherein, the operating surfaces of said housing body and said annular member are inclined with respect to each other and one has a greater inclination than the other to define the converging spacing, and said annular member has a push-release shoulder behind its inclined surface to engage said grip annulus and move it towards the diverging end of the converging spacing for releasing it from gripping engagement with said opposed operating surfaces when fluid pressure is released.

6. A coupling device as defined in claim 4 wherein, said housing body and said annular member are of plastic-like material.

7. In a joint having a pair of annular contact faces positioned in an opposed spaced-apart relationship with each other, said contact faces converging towards one end of the joint, a resilient grip annulus of somewhat resilient material to be operatively positioned between the opposed contact surfaces to restrain relative movement between said contact faces, said annulus having integral convolutions defining a substantially continuous peripheral gripping surface therealong, and said gripping surface being substantially concave across said convolutions to provide opposed side contacts with the opposed contact faces, said opposed side contacts tending to flatten out on said contact faces when the gripping action of said grip annulus is increased.

8. A joint as defined in claim 7 wherein said grip annulus is of a plastic material.

9. A joint as defined in claim 7 wherein, said convolutions are in a spaced-apart spiral relationship with each other and have an operative positioning of said side opposed contacts between the opposed contact surfaces such that said opposed side contacts widen towards each other transversely of the convolutions upon an increase of force of relative movement between the opposed contact surfaces to resist twisting movement of said convolutions along said annulus.

References Cited in the file of this patent

UNITED STATES PATENTS

| | | |
|---|---|---|
| 561,579 | Gare | June 9, 1896 |
| 2,111,956 | Baldwin | Mar. 22, 1938 |
| 2,157,820 | Fleck | May 9, 1939 |
| 2,230,069 | Rushmore | Jan. 28, 1941 |
| 2,318,590 | Boynton | May 11, 1943 |
| 2,503,093 | Buchanan | Apr. 4, 1950 |
| 2,525,285 | Collins | Oct. 10, 1950 |
| 2,542,593 | Sullivan | Feb. 20, 1951 |
| 2,579,314 | Grumblatt | Dec. 18, 1951 |
| 2,587,810 | Beyer | Mar. 4, 1952 |
| 2,638,362 | Sherman et al. | May 12, 1953 |
| 2,693,378 | Beyer | Nov. 2, 1954 |
| 2,740,987 | Moncrieff | Apr. 10, 1956 |
| 2,787,480 | Staller | Apr. 2, 1957 |

FOREIGN PATENTS

| | | |
|---|---|---|
| 1,043,119 | France | June 10, 1953 |